United States Patent [19]

Davies et al.

[11] 4,062,183

[45] Dec. 13, 1977

[54] FUEL SUPPLY SYSTEM FOR A GAS TURBINE ENGINE

[75] Inventors: David Omri Davies, Duffield; Bruce Ernest Mills, Spondon, both of England

[73] Assignee: Rolls-Royce Limited, London, England

[21] Appl. No.: 689,546

[22] Filed: May 24, 1976

[30] Foreign Application Priority Data

June 10, 1975 United Kingdom .............. 24726/75

[51] Int. Cl.² .............................................. F02C 7/22
[52] U.S. Cl. .............................. 60/39.09 F; 60/39.14; 60/39.74 R; 239/76; 137/597
[58] Field of Search ................ 60/39.74, 39.14, 261, 60/39.09 F; 239/76; 137/597

[56] References Cited

U.S. PATENT DOCUMENTS

| 2,818,110 | 12/1957 | Rulseh | 60/39.09 F |
|---|---|---|---|
| 3,087,305 | 4/1963 | Hertzog | 60/39.14 |
| 3,149,463 | 9/1964 | Withers et al. | 60/39.74 R |
| 3,158,998 | 12/1964 | Robinson et al. | 60/39.74 R |
| 3,288,447 | 11/1966 | Withers et al. | 60/39.74 R |
| 3,498,056 | 3/1970 | Avery | 60/39.09 F |
| 3,834,627 | 9/1974 | Watkins | 60/39.74 R |

Primary Examiner—William L. Freeh
Assistant Examiner—Robert E. Garrett
Attorney, Agent, or Firm—Cushman, Darby & Cushman

[57] ABSTRACT

In order to improve the start-up of a gas turbine engine, a control system is provided which fills part of the fuel manifold with compressed air during start-up so as to prevent fuel flowing to all the burners and thereby to improve the performance of the remaining burners.

9 Claims, 2 Drawing Figures

FUEL SUPPLY SYSTEM FOR A GAS TURBINE ENGINE

This invention relates to a fuel supply system for a gas turbine engine.

When a gas turbine engine is being started up there is an initial period when the fuel pressure which is fed to the burners which atomise the fuel for combustion, is very low. Under these conditions the burners may not operate completely effectively, and the consequence of this may be that the burning of the fuel is inefficient, increasing the danger of other faults such as surge of the engine's compressors.

The present invention provides a fuel supply system in which the pressure of fuel to the burners may be maintained at a relatively high level during the ignition sequence.

According to the present invention a fuel supply system for a gas turbine engine comprises a plurality of burners adapted to inject fuel into a combustion chamber, fuel supply means to the burners, and control means adapted to prevent fuel flowing through a predetermined number of the burners during the commencement of engine start-up.

The control means may be adapted to cause at least part of the fuel manifold which supplies fuel to the burners to be filled with air, thus preventing the flow of fuel through those parts of the manifold.

Figure 1:
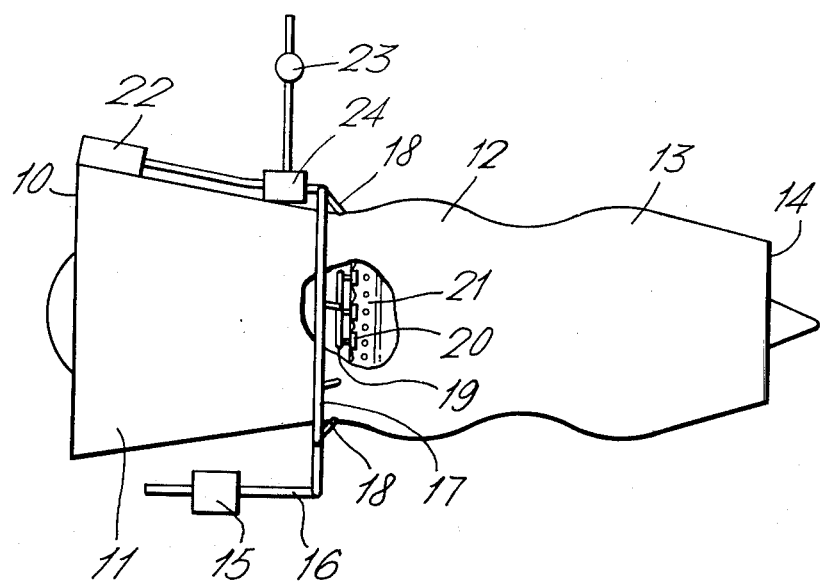
Figure 2:
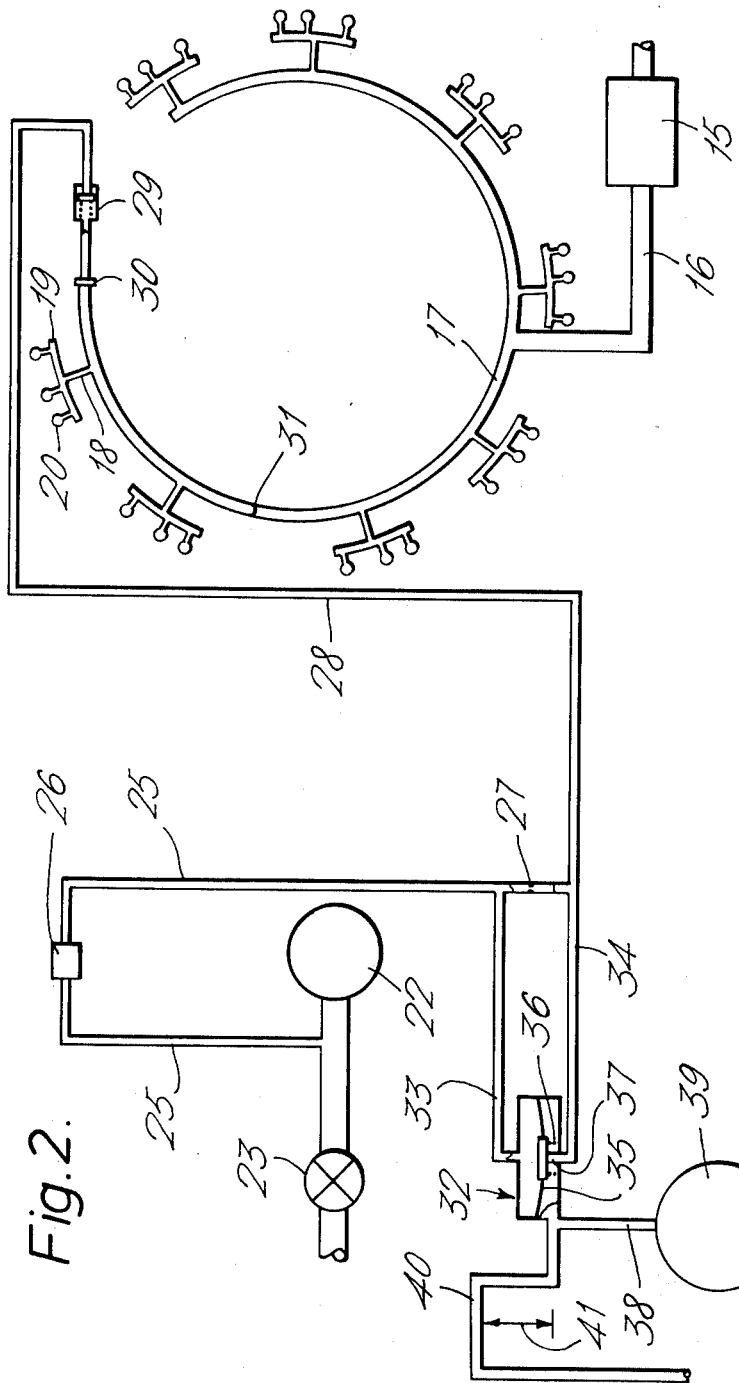

The invention will now be particularly described, merely by way of example, with reference to the accompanying drawings in which:

FIG. 1 is a partly broken away view of a gas turbine engine having a fuel supply system in accordance with the invention, and FIG. 2 is an enlarged diagrammatic view of the fuel supply system of FIG. 1.

In FIG. 1 there is shown a gas turbine engine comprising an intake 10, a compressor section 11, a combustion section 12, a turbine section 13 and a final nozzle 14. Operation of the engine is conventional in that air enters the intake 10, is compressed in the compressor 11, fuel is added and the resulting mixture burnt in the combustion section 12, and the gases thus produced leave the turbine 13 which in turn drives the compressor 11. Exhaust gases from the turbine 13 pass through the nozzle 14 to provide propulsive thrust. The fuel mentioned above is supplied to the combustion section from a tank (not shown) which feeds a fuel control system 15. From the system 15 a pipe 16 carries fuel to a ring manifold 17 which surrounds the engine just upstream of the combustion system. A plurality of radially extending feed pipes 18 carry the fuel through the casing of the engine and into distribution manifolds one of which can be seen at 19; from each of the manifolds 19 three feed arms carry fuel to the burners 20. These burners atomise the fuel and inject it into the combustion chamber 21 where it is mixed with air and burnt. It may also be necessary to provide metering valves on the feed pipes 18 to compensate for the different heights of the arms and the consequently different hydrostatic pressures.

In order to enable the engine to be started up a compressed air motor 22 is provided on the engine connected to rotate the compressor and turbine when it is operative. This motor is fed with compressed air from a source not shown by way of a starting valve 23 and a control unit 24. The control unit 24 allows air to feed into the manifold 17 as described below with reference to FIG. 2.

As can be seen in FIG. 2 the compressed air having passed through the valve 23 enters an inverted U of pipe 25 in which a pressure regulating valve 26 is provided. The valve 26 provides a predetermined maximum air pressure, while the purpose of the inverted U is made apparent below. The air leaves the U by way of a restrictor 27 and flows through a pipe 28 and a non return valve 29 into the uppermost extremity 30 of the manifold 17. It will be appreciated that on entering the manifold the air will displace some of the fuel which would otherwise fill the manifold, and the pressure of the air is arranged to be such that it extends far enough at its maximum extent to prevent fuel entering the two uppermost feed pipes 18; this extent of the air in the manifold is indicated at 31. This is arranged to be the initial condition of the system. As the engine rotates faster, the pressure of the fuel delivered by the fuel system 15 increases and while the air pressure remains sensibly constant, the fuel consequently pushes more and more of the air out of the manifold. When the interface between the fuel and the air reaches the second highest of the feed pipes 18, fuel will commence to flow through the three burners associated with this pipe, and similarly with the uppermost feed pipe. When the engine speed has reached a predetermined value (which will typically be well below idling speed) it is arranged that the fuel will completely fill the manifold up to the non return valve 29, and the fuel system will then operate normally. Also, at some point below idling speed the feed of compressed air through the valve 23 will be switched off.

It will be seen that the effect of that portion of the system described above will be to cause the fuel supply to the engine on start-up to initially feed 18 of the 24 burners illustrated. This will therefore cause the pressure of fuel in the burners to be greater than would be the case if all burners were in operation. As the speed of the engine increases, those burners which are initially blanked off become progressively opened until the engine is restored to normal conditions.

In addition to the system described above, further complications are necessary to cater for potential faults in the system. Thus, if the non return valve 29 should fail, with the system described so far, fuel can be forced into the starter motor 22, and this is highly undesirable. Therefore a relief valve 32 is provided which is supplied with a feed of compressed air from the inverted U 25 via the pipe 33 and a feed of the pressure downstream of the restrictor 27 through a pipe 34. Within the valve 32 is a spring loaded diaphragm 35 which is loaded by the spring 36 away from the inlet duct 37 from the pipe 34. The chamber below the diaphragm 35 into which inlet 37 extends is provided with two outlets, a minor outlet 38 which allows an easy flow path into the drains tank 39, and a larger outlet 40 through which fuel may flow to be dumped overboard once it has sufficient pressure to overcome the gravity head shown at 41.

Operation of these safeguards is as follows. Under normal operation, the compressed air feeds initially through the pipe 33 to force the diaphragm 35 to shut off the inlet 37; the air therefore cannot escape along the pipe 34 because of the differential areas acting on the diaphragm, and the valve will not affect normal working of the system. Should the valve 29 fail, so that fuel flows along the pipe 28, the spring loaded diaphragm will be forced open because when the fuel pressure is high, the valve 23 will be shut off. The considerable flow of fuel will therefore pass straight through the valve 32 and the pipe 40 having climbed the head 41. Although a possible path for the fuel is offered by the inverted U 25, the size of this is arranged to be such as to be greater than the possible head of fuel pressure available, and the fuel cannot pass through it; it will be understood that in practice, the inverted U 25 must be considerably larger than is illustrated.

The other possible leakage condition consists of a small leak of fuel through the valve 29. Again the fuel will flow through the valve 32 but in this case the pipe 38 will provide an easy path for the small flow into the drainage tank 39, thus avoiding any unnecessary atmospheric pollution.

It will be appreciated that there are a number of possible alternative ways of providing blanking off of a number of the burners, and that the number of burners could easily differ from those described.

It will be noted that the operation of the invention has been described above in relation to the increased pressure available at the smaller number of burners. However there is an alternative theory that the improved performance is due to the fact that burning takes place over only a portion of the annulus of the engine.

It should be realised that the source of compressed air could comprise a source of other compressed gas such as an oxygen bottle.

We claim:

1. A fuel supply system for a gas turbine engine having compressor means, combustion chamber and turbine means in flow series:
   a plurality of burners for injecting fuel into the combustion chamber;
   fuel manifold means operatively connected to each of said burners for sypplying fuel thereto;
   a source of compressed gas;
   a compressed gas operated starting device operatively connected to the compressor means and/or turbine means for starting the engine;
   duct means operatively connected to the source of compressed gas and to said compressed gas operated starting device and said fuel manifold means respectively, said duct means being arranged to supply compressed gas to said starting device for operating the same and to supply compressed gas to said fuel manifold means to act directly against fuel flowing therethrough to prevent fuel from being supplied to a predetermined number of burners; and
   valve means in said duct means upstream of the connection of the duct means to said starting device and upstream of the connection to said fuel manifold means for simultaneously supplying compressed gas to the starting device and the manifold means.

2. A fuel supply system as claimed in claim 1 including a pressure regulating valve in said duct means for controlling a maximum pressure of compressed gas delivered to said fuel manifold means.

3. A fuel supply system as claimed in claim 1 including a non-return valve in said duct means adjacent the connection of the same to said fuel manifold means whereby compressed gas and/or fuel in said fuel manifold means, when its pressure is greater than pressure of the compressed gas in said duct means, is prevented from entering said duct means.

4. A fuel supply system as claimed in claim 3 including a fail-safe control means operatively connected in said duct means intermediate said non-return valve and said compressed gas starting device for preventing fuel from flowing to said starting device should said non-return valve fail.

5. A fuel supply system as claimed in claim 4 in which said fail-safe control means includes a pressure responsive relief valve having a discharge outlet, said pressure responsive relief valve being operative to an open postion when pressure of fuel in said duct means is greater than pressure of compressed gas.

6. A fuel supply system as claimed in claim 5 including a drain tank operatively connected to said discharge outlet of said relief valve.

7. A fuel supply system as claimed in claim 5 including an outlet to atmosphere having a pre-determined gravity head means, said outlet to atmosphere being connected to said discharge outlet of said relief valve.

8. A fuel supply system as claimed in claim 7 in which said duct means upstream of said relief valve has a gravity head means greater than said gravity head means in said outlet to atmosphere from said pressure responsive relief valve.

9. A fuel supply system as claimed in claim 8 in which said gravity head means in the outlet to atmosphere is an inverted U-shaped duct, and in which said gravity head means in said duct means is an inverted U-shaped duct.

* * * * *